(12) United States Patent  
Iwamoto et al.

(10) Patent No.: US 8,040,671 B2  
(45) Date of Patent: Oct. 18, 2011

(54) INFORMATION PROCESSING APPARATUS

(75) Inventors: Akira Iwamoto, Osaka (JP); Hitoshi Nakatani, Osaka (JP)

(73) Assignee: Panasonic Corporation, Osaka (JP)

( * ) Notice: Subject to any disclaimer, the term of this patent is extended or adjusted under 35 U.S.C. 154(b) by 350 days.

(21) Appl. No.: 12/202,906

(22) Filed: Sep. 2, 2008

(65) Prior Publication Data

US 2009/0059504 A1    Mar. 5, 2009

(30) Foreign Application Priority Data

Sep. 3, 2007    (JP) ................................. 2007-227753

(51) Int. Cl.
*G06F 1/16*    (2006.01)

(52) U.S. Cl. ......... 361/679.37; 361/679.26; 361/679.58; 429/96; 429/123

(58) Field of Classification Search .............. 361/679.37
See application file for complete search history.

(56) References Cited

U.S. PATENT DOCUMENTS

| | | | | |
|---|---|---|---|---|
| 5,058,045 A | * | 10/1991 | Ma | 361/679.41 |
| 5,153,817 A | * | 10/1992 | Hosoi et al. | 361/679.37 |
| 5,182,699 A | * | 1/1993 | Kobayashi et al. | 361/679.41 |
| 5,187,643 A | * | 2/1993 | I-Shou | 361/679.37 |
| 5,363,273 A | * | 11/1994 | Ma | 361/679.37 |
| 5,446,618 A | | 8/1995 | Tetsuya et al. | |
| 5,555,487 A | * | 9/1996 | Katoh et al. | 361/679.57 |
| 5,701,230 A | * | 12/1997 | Liang et al. | 361/679.27 |
| 5,841,630 A | * | 11/1998 | Seto et al. | 361/679.58 |
| 6,178,084 B1 | * | 1/2001 | Shibasaki | 361/679.33 |
| 6,191,942 B1 | * | 2/2001 | Lee et al. | 361/679.23 |
| 6,353,535 B1 | * | 3/2002 | Yoshida | 361/679.41 |
| 6,373,693 B1 | * | 4/2002 | Seto et al. | 361/679.33 |
| 6,373,706 B1 | * | 4/2002 | Kasahara et al. | 361/725 |
| 6,385,042 B1 | * | 5/2002 | Chen | 361/679.41 |
| 2005/0201048 A1 | * | 9/2005 | Lai et al. | 361/683 |
| 2005/0213297 A1 | * | 9/2005 | Ulla et al. | 361/683 |
| 2007/0148537 A1 | * | 6/2007 | Nakatani et al. | 429/100 |
| 2009/0059505 A1 | * | 3/2009 | Iwamoto et al. | 361/684 |

FOREIGN PATENT DOCUMENTS

| | | |
|---|---|---|
| JP | 6-119082 | 4/1994 |
| JP | 2002-182788 | 6/2002 |
| JP | 2006-259797 | 9/2006 |
| JP | 2007-134105 | 5/2007 |
| JP | 2007-150953 | 6/2007 |

* cited by examiner

*Primary Examiner* — Jinhee Lee  
*Assistant Examiner* — Anthony Q Edwards  
(74) *Attorney, Agent, or Firm* — Hamre, Schumann, Mueller & Larson, P.C.

(57) ABSTRACT

An information processing apparatus in accordance with the present invention includes a battery unit 4 detachable from a first casing 1 and capable of supplying electric power to the apparatus, an HDD 8 detachable from the first casing 1 and capable of recording and reproducing data to and from an information medium, and a cover plate 5 capable of covering the HDD 8, wherein the cover plate 5 is movable between an covering position in which the HDD 8 is covered and a releasable position in which the HDD 8 can be released, and the battery unit 4 holds the cover plate 5 in place so as to be located in the covering position when the battery unit is attached to the first casing 1. With this configuration, since the HDD cannot be detached unless the battery unit is detached beforehand, the HDD can be prevented from being damaged when it is removed.

1 Claim, 6 Drawing Sheets

INFORMATION PROCESSING APPARATUS

BACKGROUND OF THE INVENTION

1. Field of the Invention

The present invention relates to an information processing apparatus, such as a note-type personal computer (hereafter called a notebook PC). In particular, the present invention relates to a structure of a housing body of the information processing apparatus.

2. Description of Related Art

In recent years, the spread of notebook PCs has expanded and notebook PCs having not only various functions but also various forms are available in the market.

The notebook PC generally is driven by power fed from a rechargeable battery. The battery is detachable from a predetermined position of the notebook PC. The latest notebook PCs are also equipped with detachable storage media such as a hard disk drive (hereafter called an HDD) and a silicon disc drive. For such a notebook PC, the detachable HDD has such main purposes as an exchange due to degradation or a failure, upgrade of memory-capacity, and data transfer. In the case of removing the HDD from the notebook PC, the general procedures are removing first a hard disk cover plate (HDD cover plate) that covers the HDD, removing an HDD-connecting connector thereafter, and finally taking out the HDD from the notebook PC.

JP H6-119082A discloses a configuration in which an HDD is detachable from an information processing apparatus, and when the information processing apparatus is fixed to an external fixed location, the HDD cannot be attached and detached to and from the apparatus. JP 2002-182788A discloses a configuration in which a battery and a detachable HDD are built-in in layers. JP 2006-259797A discloses a locking mechanism that can lock an HDD detachably to an information processing apparatus and the control method thereof JP 2007-134105A discloses a configuration in which an HDD is attached detachably to a battery pack. And JP 2007-150953A discloses a configuration in which a head of an HDD is evacuated and the disc is thereby protected when a battery is removed from an information processing apparatus.

However, when removing an HDD cover plate and removing the HDD from the notebook PC in a conventional configuration, the power of the notebook PC may be on due to the power fed from the battery. If the HDD is removed from the notebook PC in spite of the HDD being in a power-on state and in an operating state, a magnetic head in the HDD may damage the disc surface, and recording as well as reproduction of data thereby may become impossible. In the worst case, it becomes impossible to use all the recording surfaces of the disc.

SUMMARY OF THE INVENTION

The object of the present invention is to provide an information processing apparatus that can prevent an HDD from being damaged when being removed because the HDD cannot be detached unless a battery unit is detached beforehand.

The information processing apparatus according to the present invention includes a housing body, a battery unit that is detachable from the housing body and is capable of supplying electric power to the information processing apparatus, a drive unit that is detachable from the housing body and is capable of recording or reproducing data to and from an information medium, and a cover plate capable of covering the drive unit, wherein the cover plate is movable between a covering position in which the drive unit is covered and a releasable position in which the drive unit can be released, and the cover plate is held in place in the covering position by the battery unit in a state in which the battery unit is attached to the housing body.

According to the present invention, since it is necessary to remove the battery pack before removing the HDD cover plate when replacing the HDD, the detaching work of the HDD is not performed with the power being supplied to the HDD, and consequently, the damage to the HDD may thereby be prevented.

DETAILED DESCRIPTION OF THE INVENTION

An information processing apparatus of the present invention can take the following aspects on the basis of an above-mentioned configuration. That is, the information processing apparatus of the present invention can have a configuration in which the cover plate engages with a part of the housing body in the covering position, and the engagement with the part of the housing body is released in the releasable position.

Embodiment

Figure 1:
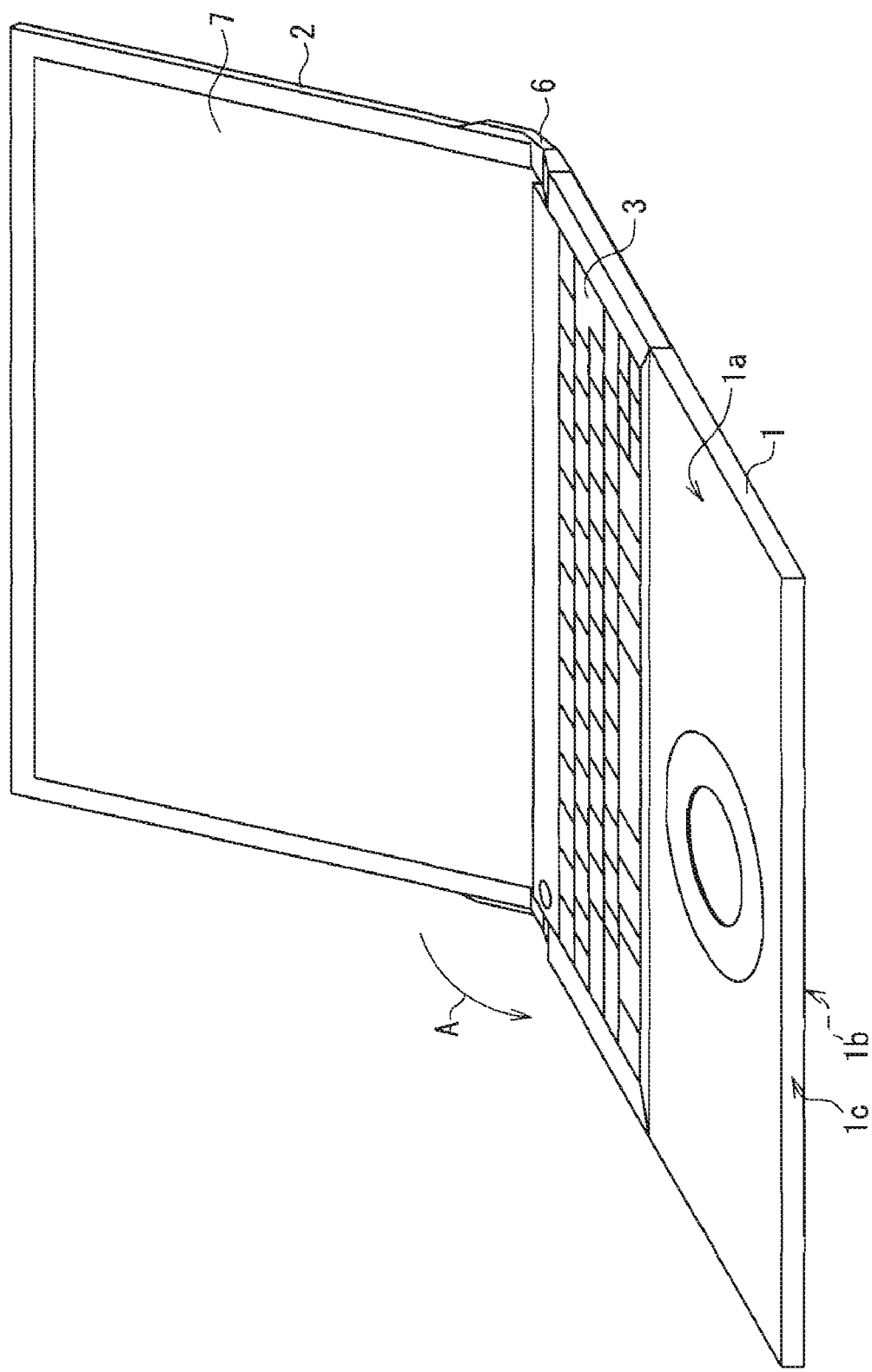
FIG. 1 is a perspective view showing an exterior of an information processing apparatus in accordance with an embodiment of the present invention.

FIG. 1 is a perspective view depicting a notebook PC in accordance with an embodiment of the information processing apparatus of the present invention.

As shown in FIG. 1, the notebook PC includes a first casing 1 and a second casing 2. The first casing 1 is provided with a keyboard 3 on the top face 1*a* thereof, and contains a central processing unit (CPU), and an electric circuit board, etc. The second casing 2 is provided with a crystal liquid monitor 7. The first casing 1 and the second casing 2 are formed with resin or a light metal (for example, aluminum, magnesium, an aluminum alloy, or a magnesium alloy). The first casing 1 is connected to the second casing 2 rotatably in the direction of the arrow A and in its reverse direction, by means of a hinge mechanism 6. Further, the state shown in FIG. 1 is defined as a first state, and a state in which the second casing 2 is moved rotatably in the direction shown in the arrow A from the first state shown in FIG. 1 and the crystal liquid monitor 7 is opposed to the keyboard 3 with an infinitesimal gap, is defined as a second state.

Figure 2:
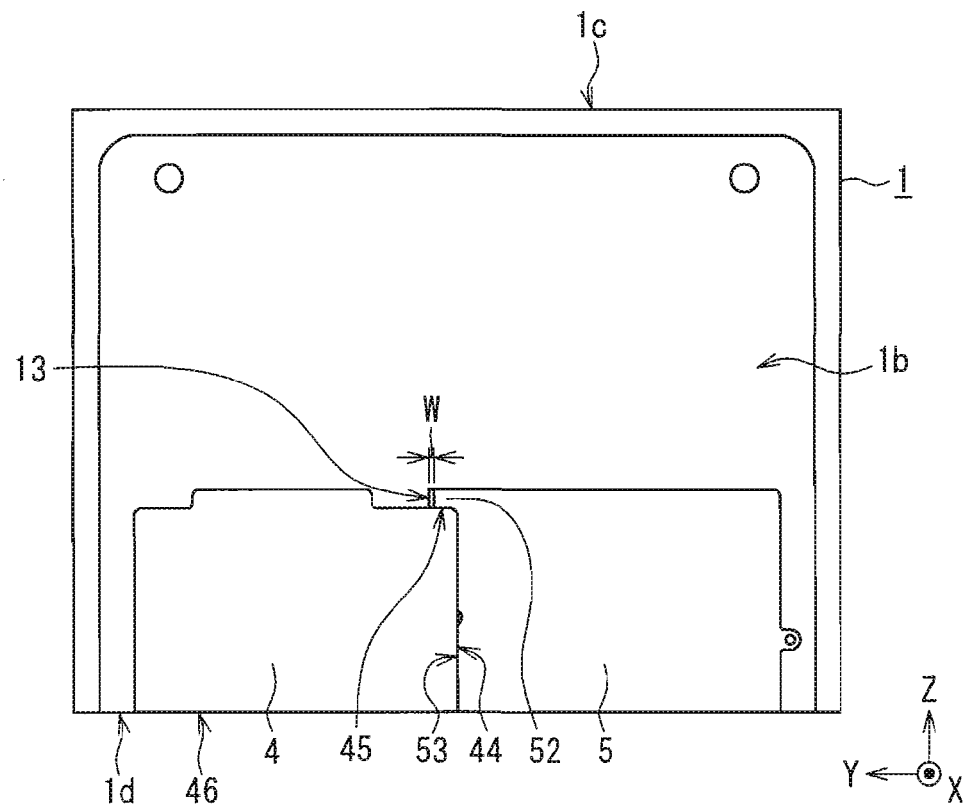
FIG. 2 is a plan view showing a state in which the battery unit and the cover plate are attached to a first casing.
Figure 3:
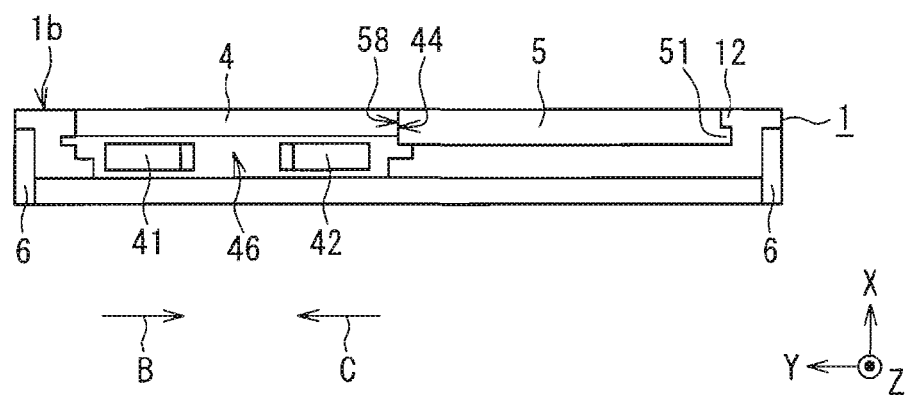
FIG. 3 is a rear elevation view showing a state in which the battery unit and the cover plate are attached to the first casing.
Figure 4:
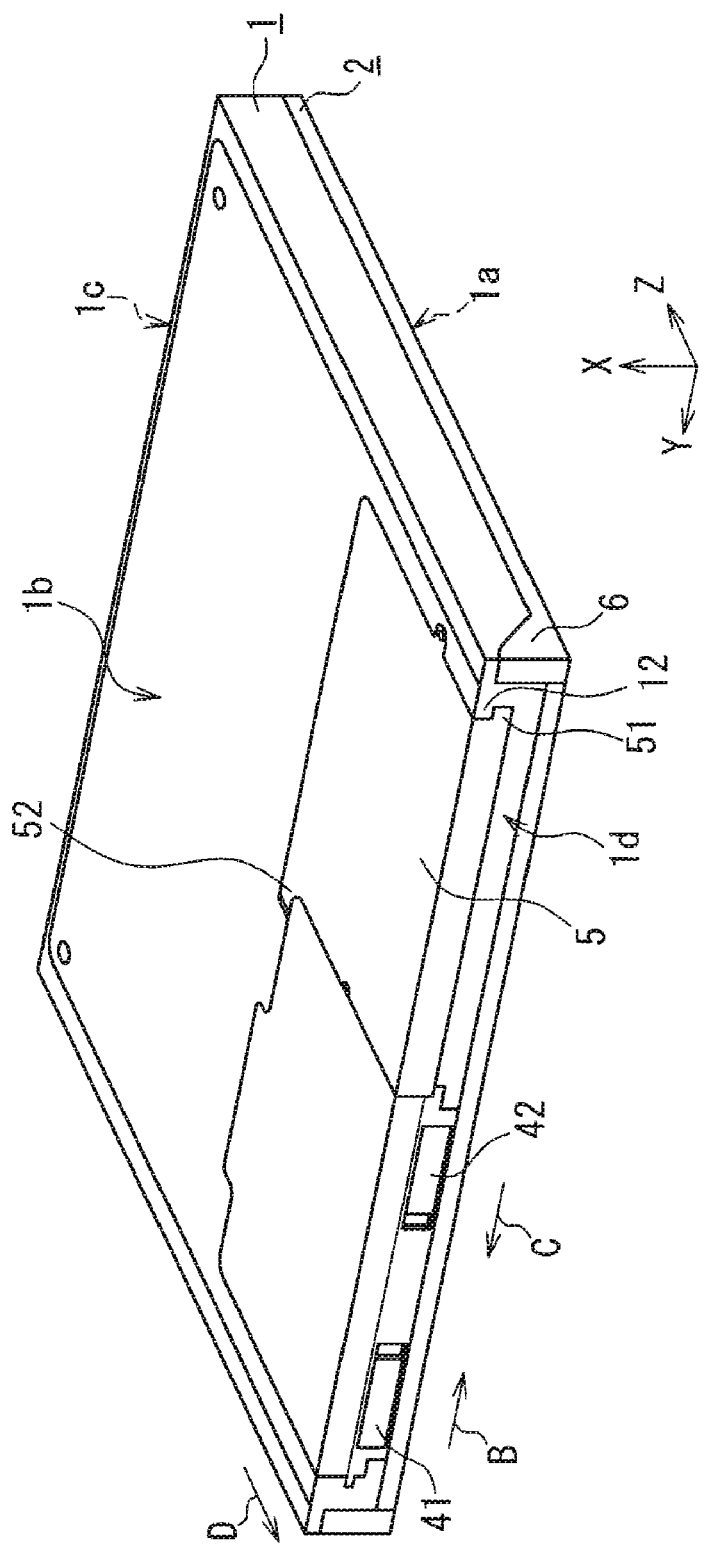
FIG. 4 is a perspective view showing a state in which the battery unit and the cover plate are attached to the first casing.

FIG. 2 is a plan view showing a configuration of the underside 1*b* of the first casing 1. FIG. 3 is a rear elevation view showing a configuration of the rear side 1*d* of the first casing 1. FIG. 4 is a perspective view of the underside 1*b* when the notebook PC is in the second state. As shown in FIGS. 2 through 4, the notebook PC is provided with a battery unit 4 and a hard-disk-drive cover plate 5 (hereafter called cover plate 5) so that they form a part of the underside 1b and the rear side 1d of the first casing 1. The battery unit 4 and the cover plate 5 are detachable from the first casing 1.

The battery unit 4 has a rechargeable battery built-in and can supply electric power to the notebook PC. The battery unit 4 is provided with slide switches 41 and 42 on its front side 46. The slide switch 41 is urged constantly to a position shown in FIGS. 3 and 4 by means of biasing means such as a spring and is slidably disposed in the direction shown in the arrow B from the position shown in FIGS. 3 and 4. The slide switch 42 is urged constantly to a position shown in FIGS. 3 and 4 by means of biasing means such as a spring and is slidably disposed in the direction shown in the arrow C from the position shown in FIGS. 3 and 4. The slide switches 41 and 42 are provided with a lock catch 43 (mentioned later by referring to FIG. 5) secured integrally thereto. Thereby, when slide switches 41 and 42 are in the position shown in FIGS. 3 and 4, the lock catch 43 fits into a hole 11b disposed in a battery-mounting portion 11 (mentioned later by referring to FIG. 5) of the first casing 1, and the battery unit 4 thereby is retained in the first casing 1. Moreover, the lock catch 43 is disposed on the side surface 44 and also on the opposite side surface of the battery unit 4 (not shown). Therefore, the hole 11b that can accommodate the lock catch 43 is formed also in an inner surface opposed to the inner surface in which the hole 11b is disposed (not shown). The battery unit 4 is provided on its rear face 45 with an electrode (not shown) that is electrically connectable to an electrode 11a (mentioned later by referring to FIG. 5) disposed in the notebook PC. The battery unit 4 also is provided with a projection portion (not shown) projecting from its rear face 45.

The cover plate 5 is disposed in a position abutting the battery unit 4. The cover plate 5 is disposed so as to cover a HDD-mounting portion 14 (mentioned later by referring to FIG. 7) in the first casing 1. Although a detailed configuration is provided later, the cover plate 5 is configured so as not to be able to be removed from the first casing 1 unless the battery unit 4 has been removed from the first casing 1.

Hereafter, a method for detaching and attaching the battery unit 4 as well as the cover plate 5 from and to the first casing 1 is described.

Figure 5:
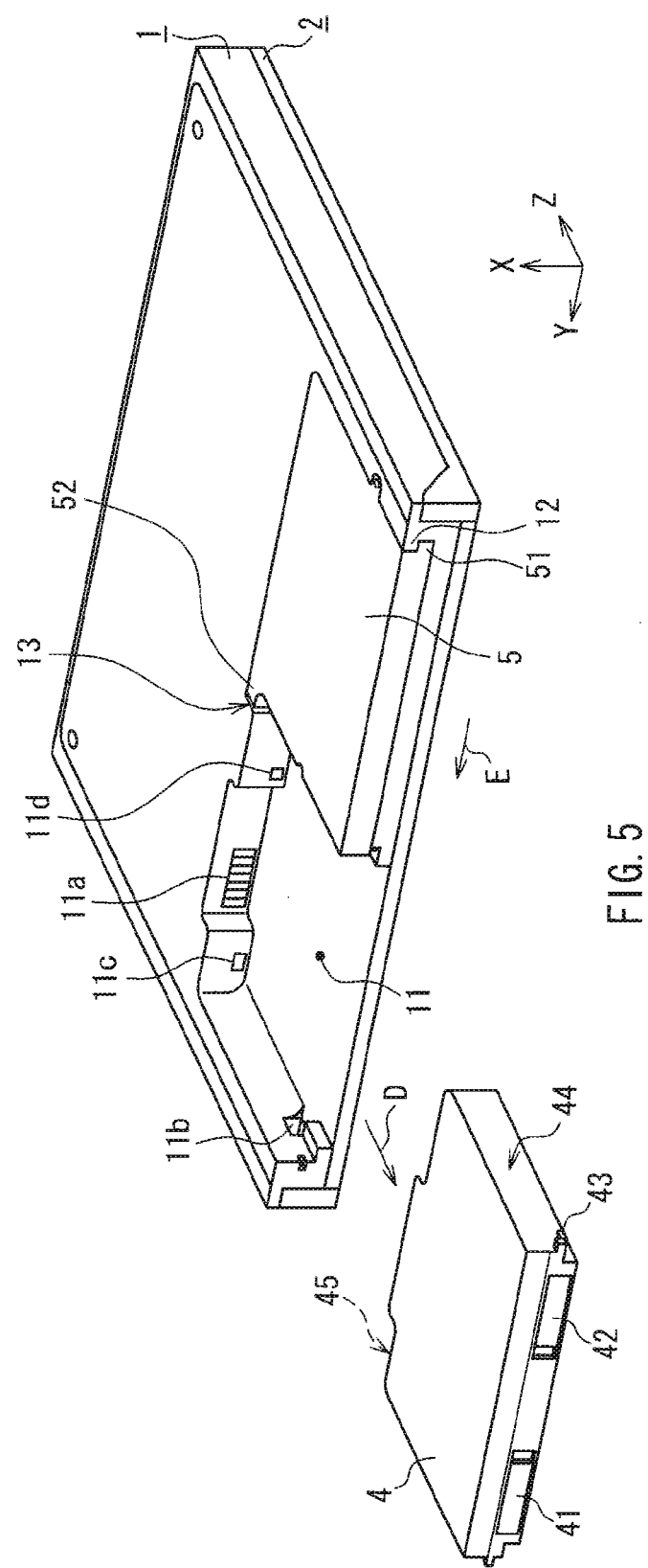
FIG. 5 is a perspective view showing a state in which the battery unit is detached from the first casing.
Figure 6:
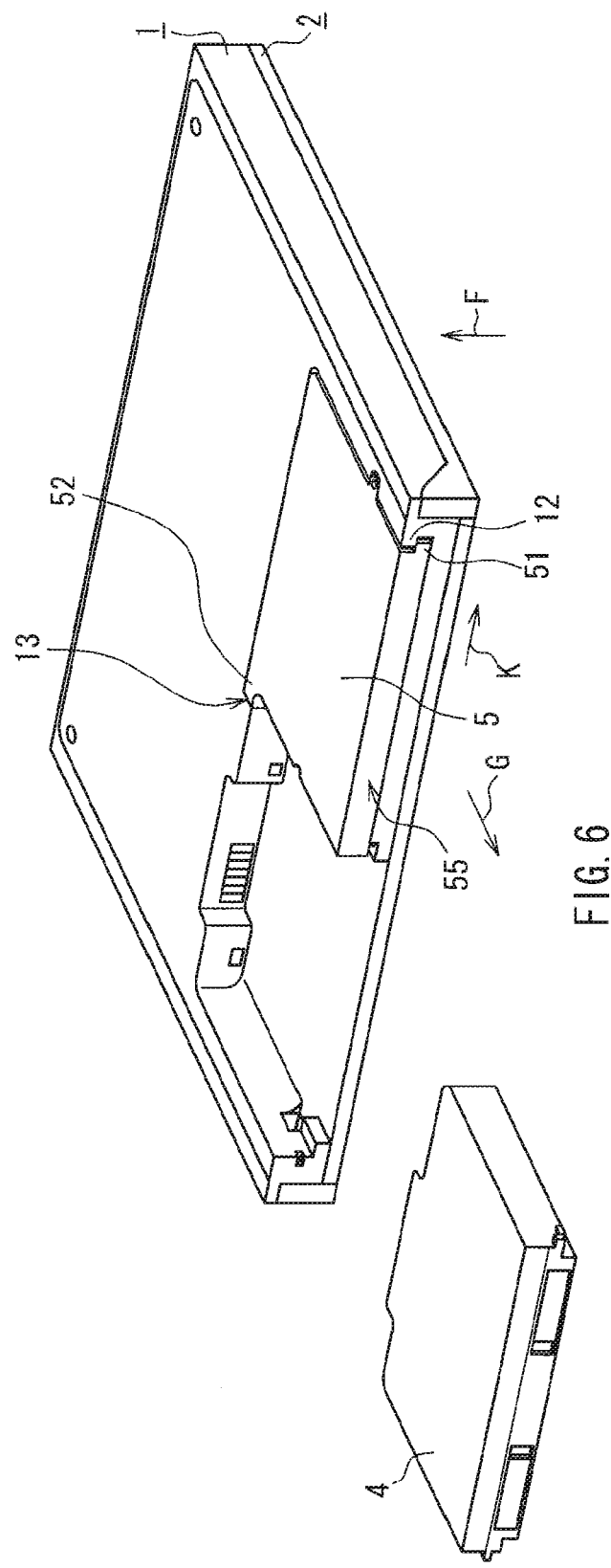
FIG. 6 is a perspective view showing a state in which the cover plate is made to slide.
Figure 7:
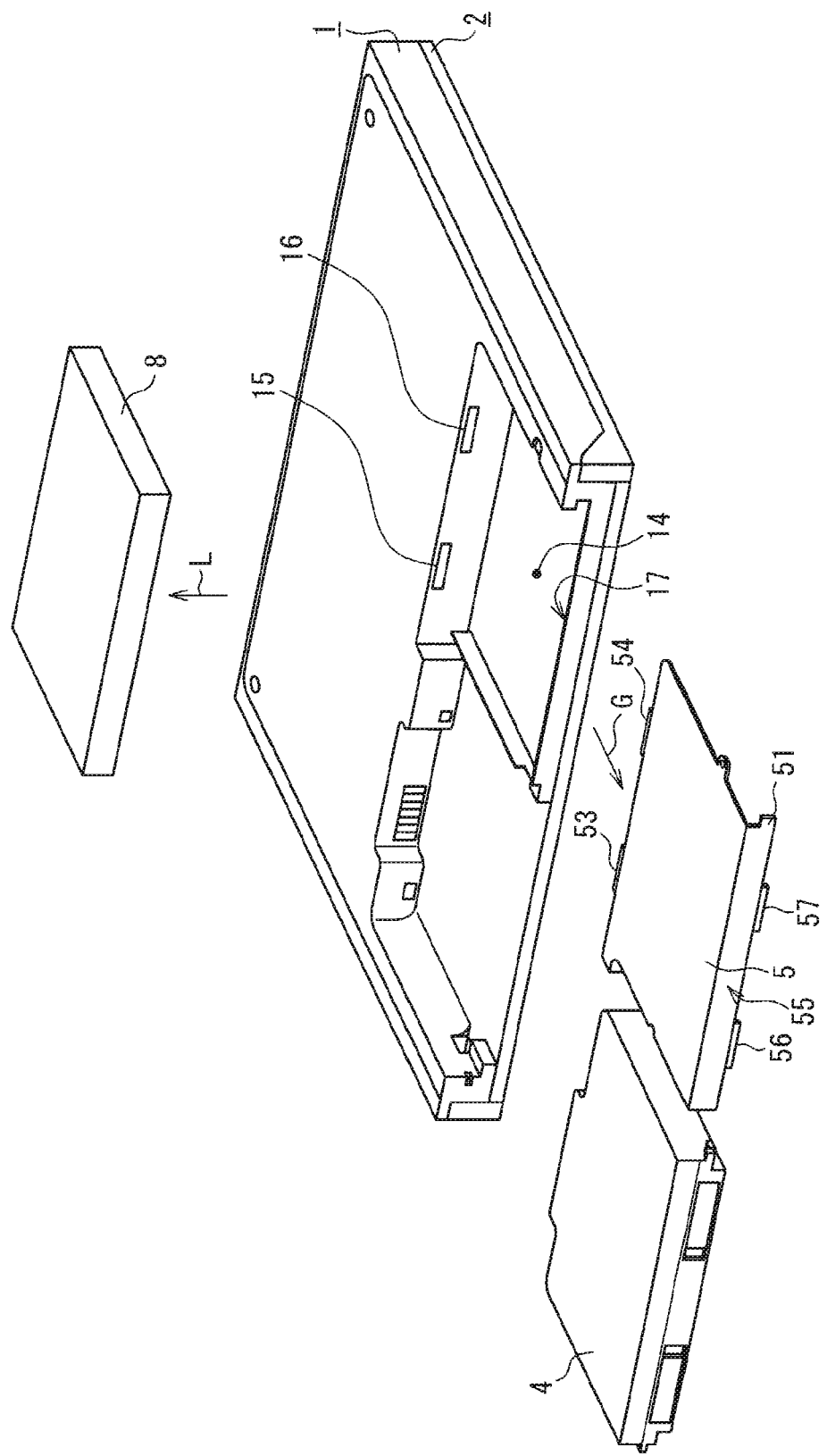
FIG. 7 is a perspective view showing a state in which the cover plate and the HDD are detached from the first casing.

FIGS. 2 through 4 show a state in which the battery unit 4 and the cover plate 5 are attached to the first casing 1. FIG. 5 shows a state in which the battery unit 4 is detached from the first casing 1. FIG. 6 shows a state in which the cover plate 5 is made to slide. FIG. 7 shows a state in which the cover plate 5 and the HDD 8 are detached from first casing 1.

First, in the state that is shown in FIGS. 2 through 4, since the lock catch 43 (refer to FIG. 5) is fitted in the hole 11b (refer to FIG. 5) disposed in the first casing 1, the battery unit 4 is held in place with respect to the Z axial direction. And furthermore, since two projection portions (not shown) disposed on the rear face 45 have fitted in the holes 11c and 11d disposed in the first casing 1, the battery unit 4 is held in place with respect to the X axial direction. Thereby, the battery unit 4 is retained in the battery-mounting portion 11 (refer to FIG. 5) in the first casing 1. At this time, since an electrode (not shown) disposed on the rear face 45 of the battery unit 4 is electrically in contact with the electrode 11a disposed in the first casing 1, it is possible to supply electric power to the notebook PC from a charging battery in the battery unit 4.

The cover plate 5 is located in a position that covers the HDD 8 (refer to FIG. 7). As shown in FIG. 2, the cover plate 5 is held in place with respect to the Y axial direction, because its side face 58 has abutted a side face 44 of the battery unit 4. The cover plate 5 is held in place with respect to the Z axial direction, because a projected portion 52 has abutted the rear face 45 of the battery unit 4 and catch parts 56 and 57 (refer to FIG. 7) formed at the lower edge of the front face 55 have engaged with the first casing 1. As shown in FIG. 3, the cover plate 5 has been held in place with respect to the X axial direction, because a projected portion 51 has engaged with the projected portion 12 of the first casing 1, and catch parts 53 and 54 are fitted in slots 15 and 16 respectively. As described above, the cover plate 5 has been held in place with respect to all the directions of the X-axis, the Y-axis, and the Z-axis, and has been retained in the first casing 1. Moreover, in this embodiment, since the cover plate 5 is fixed to the first casing 1 with a screw in the state shown in FIGS. 2 through 4, the cover plate 5 has a further configuration in which it cannot be detached easily from first casing 1.

Next, the battery unit 4 is removed from the first casing 1. Specifically, in the state shown in FIG. 4, the slide switch 41 is made to slide in the direction shown in the arrow B, and the slide switch 42 is made to slide in the direction shown in the arrow C. Thereby, the lock catch 43 (refer to FIG. 5) integrally connected to a slide switch 41 and a lock catch (not shown) integrally connected to a slide switch 42 are detached from the hole 11b (refer to FIG. 5) of the first casing 1, and the battery unit 4 has assumed a slidable state in the direction shown in the arrow D. Next, the battery unit 4 is made to slide in the direction shown in the arrow D, and is made to be detached from the first casing 1, as shown in FIG. 5. Thereby the electrode of the battery unit 4 and the electrode 11a (refer to FIG. 5) disposed on the first casing 1 can be disconnected, and the battery unit 4 and the notebook PC can be in a state in which there is no electric conduction therebetween. In the state shown in FIG. 5, the cover plate 5 is held in place with respect to the X axial direction and the Z axial direction.

Next, the cover plate 5 is removed from the first casing 1. Specifically, in the state shown in FIG. 5, the cover plate 5 is in the state in which the cover plate 5 can move in the Y axial direction because the battery unit 4 has been detached from the first casing 1. The cover plate 5 can be moved in the direction shown in the arrow E, since a gap W (refer to FIG. 2) exists between the projection portion 52 and the abutting surface 13 of the first casing 1.

FIG. 6 shows a state in which the cover plate 5 has been moved in the direction shown in the arrow E, and furthermore has been moved into the releasable position. In the state shown in FIG. 6, the projection portion 52 has abutted the abutting surface 13. In the state shown in FIG. 6, since the engagement of the projection portion 12 of the first casing 1 with the projection portion 51 of the cover plate 5 has been released, the cover plate 5 can be moved in the direction shown in the arrow F From this state, by moving the front face 55 side of the cover plate 5 in the direction shown by arrow F, the cover plate 5 can move rotatably about the catch parts 53 and 54 that serve as a pivoting axis, and catch parts 56 and 57 thereby can be detached from a lip 17. After having detached the catch parts 56 and 57 from the lip 17, by moving the cover plate 5 to the direction shown in the arrow G catch parts 53 and 54 can be detached from slots 15 and 16 respectively. Thereby, the cover plate 5 can be detached from the first casing 1, as shown in FIG. 7.

As shown in FIG. 7, by detaching the cover plate 5 from the first casing 1, the HDD 8 attached to the HDD-mounting portion 14 can be exposed. The HDD 8 has been fixed to the HDD-mounting portion 14 by fixing means such as a screw etc. The HDD 8 is provided with an input-output terminal, which is connected via a cable (not shown) to the input-output terminal disposed on the notebook PC. When detaching the HDD 8 from the first casing 1, the input-output terminal of the cable and the input-output terminal disposed on HDD 8 are disconnected, and the screw fixing HDD 8 is removed. Thereby, the HDD 8 can be detached from the first casing 1, as shown in the arrow L in FIG. 7.

From the state shown in FIG. 7, when attaching the HDD 8 to the notebook PC, reverse procedures of the above-mentioned detaching method may be carried out. That is, first, as shown in FIG. 7, the HDD 8 is mounted to the HDD-mounting portion 14 of the first casing 1. Next, as shown in FIG. 6, the cover plate 5 is attached to the HDD-mounting portion 14, and the cover plate 5 is caused to slide in the direction shown in the arrow K into the state shown in FIG. 5. Next, as shown in FIG. 4, the battery unit 4 is mounted to the battery unit mounting portion 11.

According to this embodiment, when the HDD 8 is detached from the notebook PC, it becomes essential to remove the battery unit 4 before removing the cover plate 5 covering the HDD 8. Consequently, the HDD 8 is detached after electric power fed from the battery unit 4 to the notebook PC is cut off. Therefore, when the HDD 8 is detached from the notebook PC, electric power is not being supplied to the notebook PC from the battery unit 4, and therefore, electric power is not being supplied to the HDD 8, and damage to the HDD 8 can be prevented.

In the embodiment, a configuration has been provided in which the position of the cover plate 5 is held in place by the battery unit 4 attached to the first casing 1. However, even in the case of the HDD having a configuration equivalent to the cover plate 5, the same effect as the embodiment may be obtained.

In the embodiment, the cover plate 5 has a configuration in which it is detached upward above the HDD-mounting portion 14. However, the cover plate 5 may have a configuration in which the cover plate 5 is supported slidably by the battery unit mounting portion 11. In such a configuration, when detaching the HDD from the notebook PC, the battery unit 4 is detached first from the first casing (the same procedure as this embodiment), and next, the cover plate 5 is caused to slide toward the battery unit mounting portion 11 from the HDD-mounting portion 14. The HDD is exposed when the cover plate 5 has moved over the battery unit mounting portion 11. Next, the HDD is detached from the first casing 1 by the same procedure as this embodiment. Meanwhile, when the cover plate 5 is located in the HDD-mounting portion 14, the cover plate 5 is held in position by the battery unit 4 so that it may not slide thereto.

In the embodiment, although the HDD 8 has a configuration in which the HDD 8 is detachable to the notebook PC, even in the casing of a silicon disc drive (SDD) or an optical disc drive, the same effect is acquired.

The HDD 8 in this embodiment is an embodiment of a drive unit in accordance with the present invention. Although the present invention is described using a HDD as an example of a drive unit in accordance with the present invention, the drive unit may be any such that can record or reproduce data to and from an optical disk and that can record or reproduce data to and from an information media device like a memory card that contains a semiconductor memory.

Although this embodiment is described by taking a notebook PC as an example of an information processing apparatus, any configuration in which at least a detachable battery and a detachable disk drive are provided in a main body will have the same effect as this embodiment. As an example of an information processing apparatus, there are PDA (personal digital assistance), handheld game machines, portable medical equipment, etc., for example.

The information processing apparatus of the present invention is used suitably in a battery-driven instrument such as the notebook PC.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes that come within the meaning and range of equivalency of the claims are intended to be embraced therein.

What is claimed is:

1. An information processing apparatus comprising:
   a housing body;
   a battery unit detachable from the housing body and capable of supplying electric power to the information processing apparatus the battery unit including at least one slideable lock catch that is detachable from at least one hole in the housing body;
   a drive unit detachable from the housing body and capable of recording and reproducing data to and from an information medium; and
   a cover plate capable of covering the drive unit,
   wherein the cover plate comprises a catch part and a first projection portion,
   the housing body comprises a slot that can receive the catch part and a second projection portion that can engage with the first projection portion,
   the cover plate is movable between a covering position in which the drive unit is covered and a releasable position in which the drive unit can be released,
   when the cover plate is in the covering position, the catch part is fitted in the slot, and the first projection portion engages with the second projection portion,
   when the cover plate is in the releasable position, the catch part is fitted in the slot, and the engagement of the first projection portion with the second projection portion is released, and
   the cover plate is held in place in the covering position by the battery unit in a state in which the battery unit is attached to the housing body.

* * * * *